Patented Jan. 3, 1928.

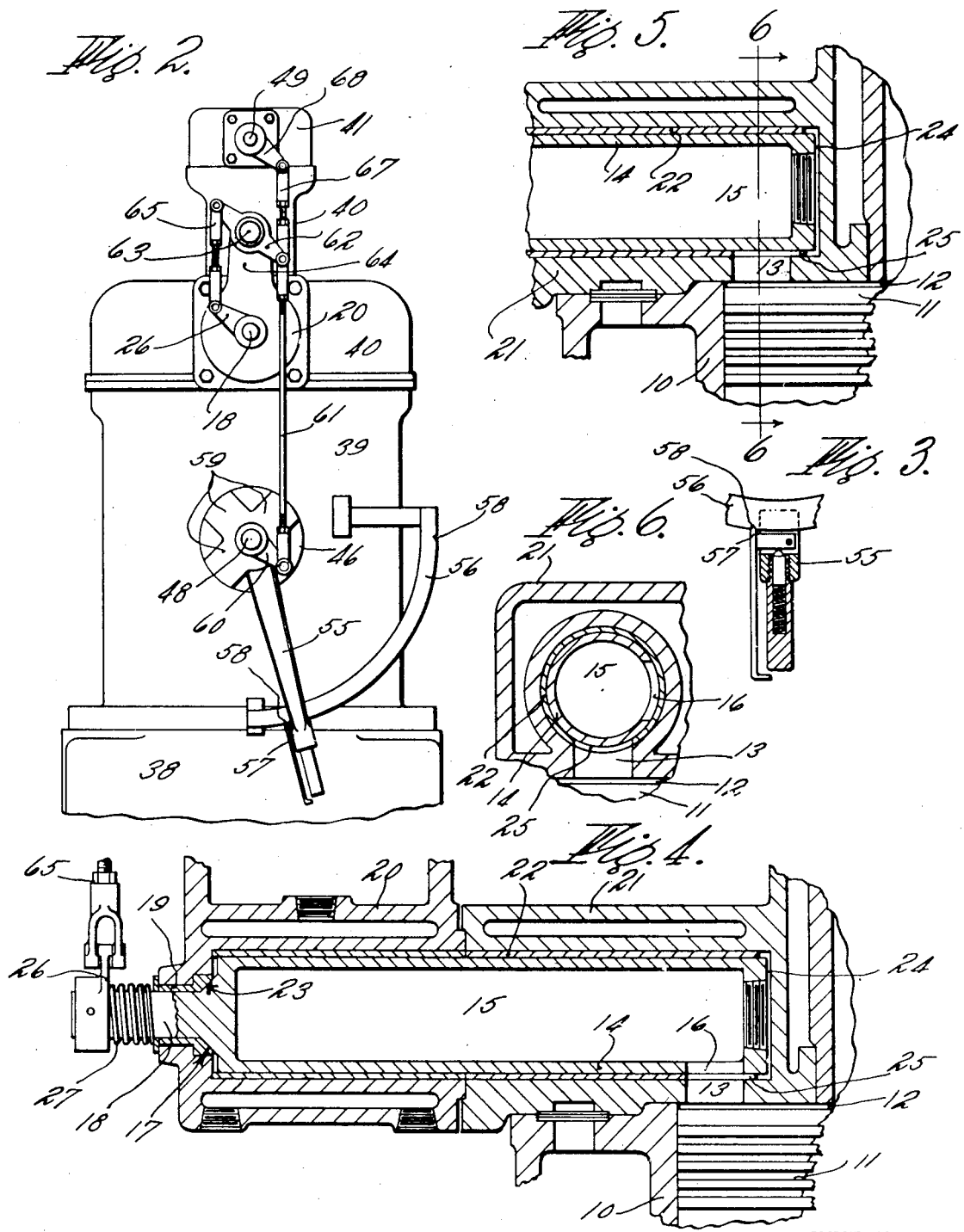

1,655,163

UNITED STATES PATENT OFFICE.

PAUL A. RITTER, OF AUBURN, NEW YORK, ASSIGNOR TO McINTOSH & SEYMOUR CORPORATION, OF AUBURN, NEW YORK, A CORPORATION OF NEW YORK.

UNLOADER DEVICE FOR COMPRESSORS.

Application filed March 10, 1927. Serial No. 174,222.

This invention relates to so-called unloader devices and, more particularly, to an improved device of this general character which is adapted for use with a compressor to enable variations in the clearance space thereof to be effected when desired.

The invention, while capable of general application wherever it is desired to increase or diminish the clearance space of a cylinder, has been developed for use in connection with a multiple stage air compressor, such for example as that used for supplying compressed air for fuel injection and for starting and other purposes in internal combustion engines of the Diesel type. In many Diesel engine installations, it has been found desirable to provide an oversize compressor, driven from the engine and having a maximum capacity sufficient to meet what may be termed abnormal or emergency demands for compressed air. That is, occasions arise where a supply of compressed air, in excess of the normal requirements of the engine, is desired. In such cases, the compressor, in regular service, has to furnish only a small percentage of its maximum capacity. Since the compressor has a fixed stroke and it is not feasible to take care of the variations in loads by variations in speed of the compressor, it becomes essential to provide means whereby the clearance spaces of the several cylinders of the compressor may be increased or diminished according to whether it is called on to perform a minimum or a maximum amount of work.

I am aware that provisions for the unloading, or partial unloading, of air compressors have been made heretofore and that various examples are to be found in the prior art of unloading devices which operate on the principle of increasing or diminishing the clearance space of the cylinder of an air compressor.

My invention, however, is directed to and has for an object the provision of an improved unloading device which is better suited to the particular work in hand than any of the prior art devices with which I am familiar. It is likewise suited for other uses than the particular one above alluded to and, as will be apparent from the following description, it may be used generally whether the compressor is of the multiple stage type or otherwise.

The unloading device of this invention, in common with those of the prior art, includes a clearance chamber and a valve for connecting this chamber to the cylinder of the compressor, when desired, whereby the volume of the clearance chamber may be added to the volume of the clearance space of the compressor cylinder to thereby reduce the load on the compressor. Unlike the devices of the prior art, my invention is characterized in that the valve and clearance chamber are combined. That is, the valve, which is movable to control the loading or partial unloading of the cylinder, is recessed to form a clearance chamber of the desired volume or, expressing it in another way, the clearance chamber is movable, as distinguished from a stationary one, and a wall of this chamber is made to function as the controlling valve.

Aside from this feature, the invention has for an object the provision of an unloading valve which is so arranged as to turn with comparative ease notwithstanding the high pressures to which it is subjected and at the same time to be effectively sealed against leakage of compressed air.

Another object of the invention is to provide in a multiple stage compressor, an unloader device associated with each stage thereof and to connect the several devices by a linkage such that they may be simultaneously operated.

Other objects and advantages will appear from the following description and will be pointed out in the appended claims.

The invention will be disclosed with reference to the accompanying drawings, in which:—

Fig. 2 is an exterior end elevation showing the mechanism for simultaneouly operating the several unloader devices;

Fig. 3 is a fragmentary sectional view taken on the line 3—3 of Fig. 1 and showing a detail of the operating mechanism;

Fig. 4 is a fragmentary sectional elevation, taken similarly to Fig. 1 but drawn to a larger scale and showing in full detail one of the unloader devices in "unloading" position;

Fig. 5 is a fragmentary sectional elevation showing the unloader device of Fig. 4 in its other position; and Fig. 6 is a fragmentary cross sectional view taken on the line 6—6 of Fig. 5.

Figure 1:
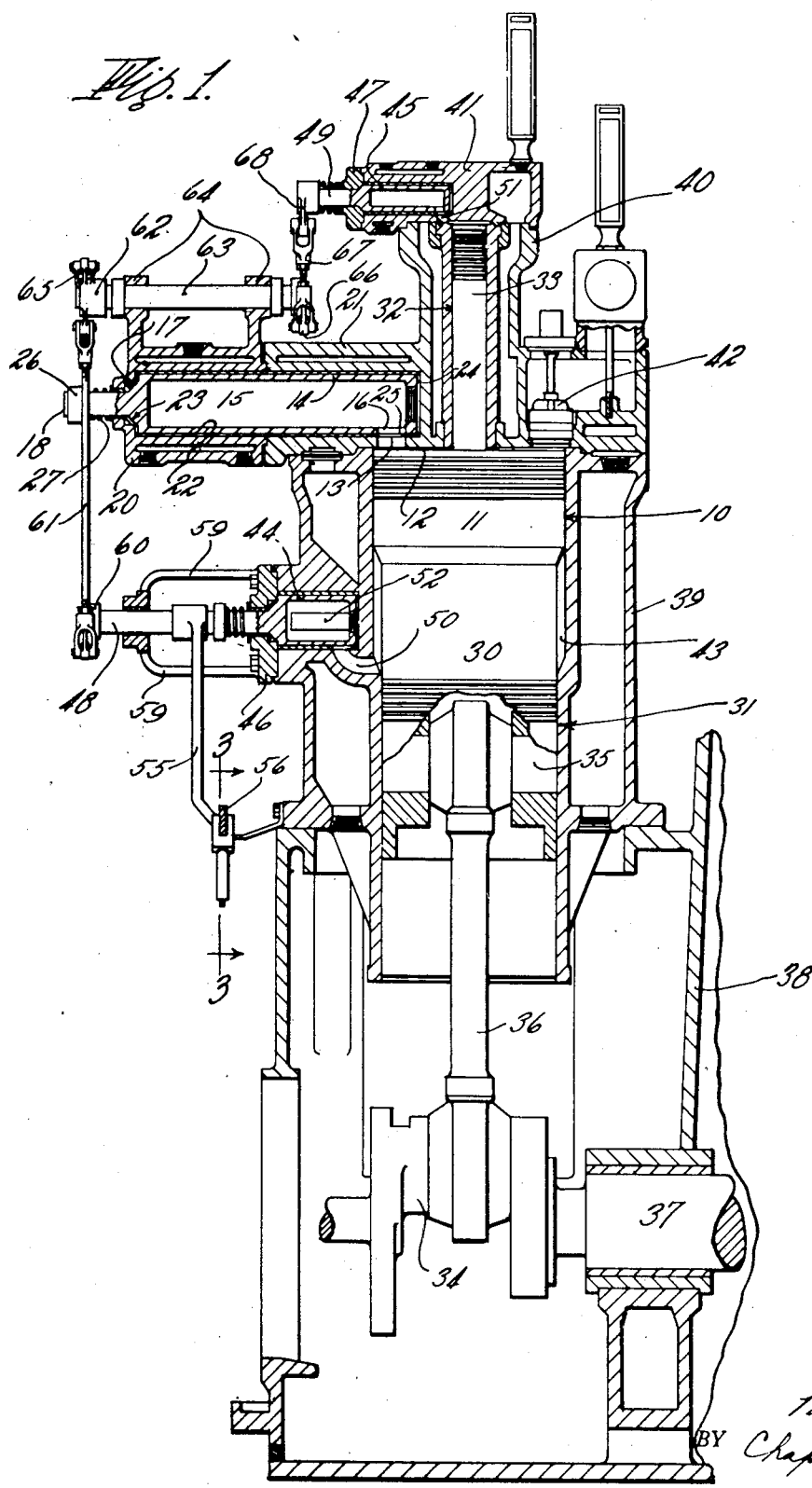
Fig. 1 is a central sectional elevation of a multiple stage air compressor, having associated with each stage thereof an unloader device embodying my invention.

Referring to these drawings and particularly to Fig. 4; 10 and 11 represent the cylinder and piston, respectively, of a compressor,—the piston being in its uppermost position leaving a clearance or compression space 12. Leading from space 12 is a port 13 which opens into a cavity in which a member 14 is mounted for suitable movement. This member 14, which cooperates with port 13 as a valve, is made hollow for the particular purpose of providing a clearance chamber 15. The chamber 15 is closed except for a single port 16 which is formed in a wall of the member 14 and which is so located with respect to port 13 that it may be moved into or out of registration therewith when the member is moved. Thus, the volume of chamber 15 can be added to the volume of the clearance space of cylinder 10 when it is desired to unload the compressor. The arrangement, just described, is characterized in that the valve, which is movable to control the loading and unloading of the cylinder, is recessed to form a clearance chamber of the desired volume, or to state the matter in another way, the clearance chamber is a movable, rather than a stationary one, and a wall of this chamber is made to function as the controlling valve.

For convenience and simplicity, I prefer to make the member 14 of circular cross section and preferably in hollow cylindrical form, as shown. The port 16 can then be formed in the peripheral wall of the valve and the valve mounted for turning or oscillating movement. Such an arrangement also enables the use of a simple operating mechanism, later to be described, whereby several unloading valves, similar to that just described, may be simultaneously operated.

The member 14 on the outer face of one of its end walls (that remote from port 16) is provided with a frusto-conical valve 17 and beyond the valve with an operating spindle 18. Both valve 17 and spindle 18 are, in the particular forms shown, integral and integral with the valve 14. The spindle 18 passes through an opening in a bushing 19 fixed to a casting 20. The latter is fixed to, and forms in conjunction with a casting 21, a housing for the member 14. The casting 21 is connected to a wall of cylinder 10 and, as shown is integral with the head thereof although this arrangement is not in any sense essential. A bushing 22 is fixed in such housing and the member 14 is mounted in the bushing so as to freely turn therein. The member 14 is likewise free to slide axially within limits in the bushing 22. The bushing 19 is formed with a valve seat 23 with which valve 17 cooperates. The outer end face of member 14 is spaced from the adjacent end wall of the housing so as to allow freedom for outward axial movement of the valve, and so as to allow valve 17 to be tightly pressed against its seat even after these cooperating parts have been worn considerably. The inner end face of member 14 likewise is spaced from the inner end wall of the housing so as to provide a space 24. Into this space air from port 13 may enter by way of a slot 25, which is formed in bushing 22 and leads axially inward from the inner end of the bushing far enough to afford full communication between the ports 13 and 16, when member 14 is positioned as shown in Fig. 4. The spindle 18, which extends outside the housing, has fixed thereto a lever 26, whereby it may be turned and between the hub of this lever and the adjacent end wall of casting 20 is a spring 27 which is coiled around spindle 18 and tends to move it axially outward and hold valve 17 to its seat 23.

As a result of the construction just described several important advantages follow. First, I am enabled to dispense entirely with the conventional stuffing box which would ordinarily be used in connection with spindle 18 to prevent leakage around the latter where it passes out of the housing. Second, I obtain an effective seal against such leakage by the use of the valve 17 and seat 23. The effectiveness of the seal is due to the fact that the member 14, with respect to pressure acting on it in directions parallel to its axis, is unbalanced and is biased to move axially outward so as to force valve 17 tightly against its seat. The arrangement has this characteristic, viz, that the greater the air pressure (and thus ordinarily the greater the chance for leakage) the more tightly valve 17 is pressed against its seat. Third, the member 14 is made to turn as easily as possible. This result follows because the member, except in the one particular just referred to, is balanced and, except for the pressure of valve 17 against its seat, there are no parts of the member 14 which are forced against the stationary parts of the housing under high pressure. The area of contact between the valve 17 and its seat 23 is, of course, relatively small and, therefore, since there are no other contacting parts under great pressure, the member 14 can be turned with comparative ease.

The results, just described, will be apparent from a consideration of Fig. 4. The air in chamber 15 presses outwardly on the peripheral wall of member 14 in every radial direction and an outward thrust at any point on such wall is exactly balanced by an equal thrust in an opposite direction at an oppositely located point in the wall. So also, if air finds its way between the interior peripheral surface of the bushing and the outer peripheral wall of member 14, the inward pressure at every point is balanced by an equal but opposite pressure at an oppositely located point. The pressure of the air in the inner faces of the end walls of member 14 are equal and opposed and thus balanced. The end face of spindle 18, however, is always subjected to atmospheric pressure and so also is part of the valve 23 in case the same, as is usual, has only a narrow ring of contact with its seat. The inner end wall of member 14 is subjected to the pressure prevailing in cylinder 10 and thus, when such pressure is greater than atmospheric pressure, there results an axially outward force on member 14 and the connected valve 23. The force, for this purpose is equal to the unit pressure prevailing at the time, multiplied by the unbalanced area of the ends of member 14, i. e., the area of the end face of the spindle plus such part of the valve area as is subjected to atmospheric pressure only. The same conditions, as just described, obtain whether the member 14 is positioned as shown in Fig. 4 or in some other position, such as that shown in Fig. 5, wherein communication between ports 16 and 13 is prevented. The internal pressures in chamber 15 are balanced and whatever the unit pressure prevailing therein and regardless of whether such unit pressure is greater or less than that prevailing outside the chamber, there is no tendency to move the member 14. So also the pressures on the exterior periphery of member 14 are balanced. The pressures on the outer end faces of the member 14 are unbalanced, as before, so that the axial outward thrust is available to hold valve 17 to its seat.

The spring 27 is not necessarily essential for all purposes but it is generally desirable because it keeps the valve 17 on its seat when air pressure for this purpose is not available. For example, when the parts are originally assembled and before the compressor has been operated to build up pressure, the spring then functions for the described purpose. It will likewise do the same work at any other time when a similar condition obtains. Also, when the piston 11 sucks in air directly from the atmosphere, a small subatmospheric pressure might momentarily prevail in cylinder 10 and spring 27 will prevent a possible unseating of valve 17 in such a case. If this valve were allowed, even momentarily, to move away from its seat, then when it is subsequently moved back into contact with its seat under high pressure, an undesirable impact of the valve on its seat would result. Repeated impacts of this nature would necessarily increase the wear on the valve and its seat and lessen the useful life of each.

The invention has thus far been disclosed in connection with a single cylinder of a compressor. The invention, in many of its aspects, is independent of whether the compressor has one or more cylinders. In certain aspects, the invention lends itself nicely to embodiment in a multi-stage air compressor and I have in Fig. 1 illustrated such an embodiment of the invention. Referring to that figure, the cylinder 10 and piston 11, hereinbefore described, constitute the low pressure cylinder and piston and the valve member 14, with the clearance chamber 15 therein, is associated with the first stage of the compressor. Integral with piston 11 and below the same is the intermediate piston 30 which works in a cylinder 31 of somewhat less diameter than cylinder 10. The high pressure cylinder and piston are designated 32 and 33, respectively, the piston 33 being fixed to piston 11 and extending upwardly therefrom. The three connected pistons may be reciprocated in any suitable manner. As shown, they are reciprocated by a crank 34, which is connected to a wrist pin 35 in piston 30 by a connecting rod 36. In the particular case illustrated, crank 34 is connected to the crankshaft 37 of a Diesel engine, a part of which (the base casting) is indicated at 38. The block 39, in which cylinders 10 and 31 are formed, is mounted upon such base casting. The cylinder 32 is inserted in a casting 40 secured to the top of block 39 and serving as a head for cylinder 10. That part of the housing for valve member 14, designated 21 in the above description, is an integral part of block 40. A head 41 is secured on top of the high pressure cylinder block 39.

The various valves and air passages associated with the several cylinders of the compressor are not illustrated except that the suction valve for the low pressure cylinder 10 is indicated in more or less conventional form at 42. Illustration and description of such valves and passages is unnecessary to an understanding of this invention. It will suffice to state that when piston 11 moves downwardly from the illustrated position, it sucks in air through the then open valve 42 and on the return stroke compresses the volume of air thus drawn in to a certain pressure. In the second stage, air compressed in the first stage is admitted into space 43 as piston 30 moves upwardly and on the downstroke of this piston is compressed to a still higher degree. In the third and final stage, air from the second stage is admitted to cylinder 32 when piston 33 is moving downwardly and on the upstroke of this piston is compressed to the final pressure and delivered, usually into a suitable receiver (not shown).

In connection with each cylinder of the compressor, I provide a valve member, having a clearance chamber therein, similar to the valve member 14 already described. Member 14 is associated with the low pressure cylinder. The corresponding valve members for the intermediate and high pressure cylinders are designated 44 and 45, respectively. The valve member 44 is housed in a recess formed in block 39 and valve member 45 in a recess formed in head 41. These housing recesses are closed at their outer ends by caps 46 and 47 respectively, through which the operating spindles 48 and 49 for valve members 44 and 45, respectively, expand. The port in valve member 44 can move into or out of registry with a port 50 leading to the lower part of the annular area 43, and thus to the compression space of the intermediate cylinder. The port in valve member 45 can move into and out of registry with a port 51 leading to the upper end of the high pressure cylinder. These valve members 44 and 45 are similar in every respect, except length and diameter and, in the case of valve 44, except for the plug 52. The latter is screwed into the inner end wall of valve member 44 and serves to vary the volume of the clearance chamber formed therein. Functionally, all three valve members 14, 44 and 45 are alike and the only essential difference of any kind is that the clearance chambers formed therein have different volumes. That is, the clearance volumes of the valve members 14, 44 and 45 vary in the same proportion as the normal clearance volumes of their respective cylinders vary.

In order to simultaneously operate the valve members 14, 44 and 45, I provide the mechanism best shown in Fig. 2. This mechanism includes a main operating lever 55 which is fixed at one end to the spindle 48 of valve member 44 and is effective through links and levers to operate valve members 14 and 45. This lever 55, at its other end, has a part adapted to play over an arc shaped plate 56 secured to block 39. Associated with lever 55 is a spring pressed detent 57 (see Fig. 3) which is urged at all times toward plate 56 and can engage in either of two notches 58 therein. When lever 55 is so positioned that detent 57 engages in the lower notch 58 the several valve members are so positioned as to unload the compressor, i. e., in positions corresponding to that shown in Fig. 4 in connection with valve member 14. When lever 55 is moved until detent 57 engages in the upper notch 58, the several valve members are positioned so that their clearance chambers are out of communication with their respective cylinders, i. e., in positions corresponding to that shown in Figs. 5 and 6 in connection with valve member 14. The spindle 48 is extended far enough so that its outer end underlies the corresponding end of spindle 18. The free end of spindle 48 is supported in a bearing formed in a spider 59 which projects outwardly from and is an integral part of cap 46. Fixed to the free end of spindle 48 is a lever 60, which is connected by a link 61 to one end of a lever 62. The latter, at a point intermediate its ends, is fixed to the outer end of a rock shaft 63 which is supported as shown in Fig. 1 by bearing brackets 64 formed on the casting 22 and upstanding therefrom. The other end of lever 62 is connected by a link 65 to the described lever 26. On the rear end of rock shaft 63 is fixed a lever 66 which is connected by a link 67 to a lever 68 fixed to the spindle 49 of valve 45. The linkage just described is such that the spindles of the several clearance valve members will be turned simultaneously and by substantially equal angular increments when the main operating lever 55 is moved.

For the particular use, first above alluded to, the control lever 55 is normally positioned as shown in the drawings so that the several clearance chambers are connected to their respective cylinders. The compressors then supplies compressed air at its minimum rate suitable for the normal demands. When, however, there are abnormal demands for compressed air, the operator simply swings lever 55 upwardly until detent 57 lodges in the upper notch 58. The several clearance chambers are thus simultaneously cut off from their respective cylinders and the compressor then operates at its maximum rate. The invention, obviously is not limited to this special plan of operation and is capable of being, and may be, otherwise operated as desired.

It will be apparent that the invention offers a very desirable solution of the problem of partially unloading a compressor for the particular type of service described. This same solution is, obviously, equally well applicable to compressors for other classes of service, wherever a fixed degree, usually although not necessarily at will, is desired. The combining of the clearance chamber and the valve for controlling the unloading affords a more compact arrangement than could be had if these members were made separately when the valve would have to be interposed between a fixed clearance chamber and the cylinder of the compressor. The balancing of the combined clearance chamber and valve member, except for the purposely endwise-unbalanced condition, renders the member comparatively easy to turn. Also the mounting of the several members for turning movement enables an interconnection of them by a simple linkage whereby the several members may be simultaneously operated. The sealing arrangement, whereby leakage around the operating spindle is prevented without resort to the usual stuffing box, is effective and an important feature of the invention utilizing as it does the compressed air, or other medium, as the force for keeping the cooperating sealing parts continually in contact.

The invention has been disclosed herein, in an embodiment at present preferred, for illustrative purposes but the scope of the invention is defined by the appended claims rather than by the foregoing description.

What I claim is:

1. The combination with a cylinder and its piston, of a hollow member the interior of which forms a clearance chamber, an opening provided in said member, and means for bodily moving said member to carry said opening into or out of communication with the clearance space of said cylinder.

2. The combination with a cylinder and its piston, of a hollow cylindrical valve closed except for a port in its peripheral wall, and means for turning said valve to carry said port into or out of communication with the clearance space of said cylinder.

3. The combination with a cylinder of a compressor and its piston, of a hollow oscillatable barrel-like member the interior of which forms a clearance chamber, a port provided in said member adapted to be brought into or out of communication with the clearance space of said cylinder when the member is turned, an operating spindle on one end of said member, a housing in which said member is mounted having an opening through which said spindle passes out of the housing, the interior of said housing being subjected to the pressure prevailing in said cylinder and said pressure acting on the periphery of said member in balanced fashion to permit free turning thereof and acting in unbalanced fashion on the ends of said member imparting an outward thrust to said member, and cooperating means on said member and housing engageable by said outward thrust to seal the housing against leakage around said spindle.

4. The combination with a cylinder and its piston, of a housing connected to a wall of the cylinder and having a cavity therein connected by a passage to the clearance space of the cylinder, a hollow member mounted for turning movement in said cavity and free for limited longitudinal sliding movement therein, said member having a port therein adapted when the member is turned to be brought into or out of communication with said passage, whereby the space within said member may be added to the normal clearance space of said cylinder when desired, an operating spindle connected to said member and extending out through the housing at one end of said cavity, and means for connecting the other end of said cavity to the clearance space of said cylinder, whereby said member may be moved longitudinally toward the first named end of said cavity by the pressure prevailing in said cylinder, and cooperating means on said member and housing at the first named end of said cavity forced into close contact by said pressure to seal the cavity against leakage around said spindle.

5. In combination with a cylinder and its piston, a housing connected to a wall of the cylinder and having a cavity therein and a passage leading from the cavity to the clearance space of said cylinder, a plug valve mounted in said cavity for turning movement about its axis and adapted to open and close said passage, a passage provided in said housing whereby one end face of said valve is subjected at all times to the pressure prevailing in said cylinder, an operating spindle of less area than said end face of the valve and connected to the opposite end face thereof and extending outwardly from said body member, and a valve encompassing said spindle and forced by air pressure acting on said first named end face against said body to prevent leakage from said cavity around said spindle.

6. In combination with a cylinder and its piston, a housing connected to a wall of the cylinder and having a valve cavity of circular cross section and a passage leading from said cavity to the clearance space of said cylinder, a hollow valve member mounted in said cavity to turn about the axis thereof, said member being closed at both ends and having a port in its peripheral wall adapted to be moved into or out of communication with said passage when said member is turned, said housing having an opening at one end of said cavity and a valve seat encompassing the same, an operating spindle connected to one end face of the valve member and extending outwardly through said opening, a valve connected to the spindle and cooperating with said seat to seal said cavity against leakage around said spindle, there being a space between the other end face of said member and the adjacent end wall of said cavity, and a passage provided in said housing leading from the last named space to the clearance space of said cylinder, whereby said member is thrust axially outward by the pressure prevailing in said cylinder to press said valve against its seat.

7. In combination with a cylinder and its piston, a housing connected to a wall of the cylinder and having a valve cavity of circular cross section and a passage leading from said cavity to the clearance space of said cylinder, a hollow valve member mounted in said cavity to turn about the axis thereof, said member being closed at both ends and having a port in its peripheral wall adapted to be moved into or out of communication with said passage when said member is turned, said housing having an opening leading outwardly from one end of said cavity and a valve seat encompassing the opening, an operating spindle connected to one end face of said member and extending outwardly through said opening, said spindle having an end face of less area than either end face of said member and subject at all times to atmospheric pressure, a valve connected to the spindle and cooperating with said seat to seal said cavity against leakage around said spindle, there being a space between the other end face of said member and the adjacent end wall of said cavity, and a passage provided in said housing leading from the last named space to the clearance space of said cylinder, whereby said member is thrust axially outward by the pressure prevailing in said cylinder to press said valve against its seat.

8. In combination with a cylinder and its piston, a housing connected to a wall of the cylinder and having a valve cavity of circular cross section and a passage leading from said cavity to the clearance space of said cylinder, a hollow valve member mounted in said cavity to turn about the axis thereof, said member being closed at both ends and having a port in its peripheral wall adapted to be moved into or out of communication with said passage when said member is turned, said housing having an opening leading outwardly from one end of said cavity and a valve seat encompassing said opening, an operating spindle connected to one end face of said member and extending outwardly through said opening, a valve connected to the spindle and cooperating with said seat to seal said cavity against leakage around said spindle, there being a space between the other end face of said member and the adjacent end wall of said cavity, and a passage provided in said housing leading from the last named space to the clearance space of said cylinder, whereby said member is thrust axially outwards by the pressure prevailing in said cylinder to press said valve against its seat, and a spring encompassing said spindle and tending to draw said valve against its seat.

9. In combination with a cylinder and its piston, a housing connected to a wall of the cylinder and having a valve cavity of circular cross section and a passage leading from said cavity to the clearance space of said cylinder, a hollow valve member mounted, in said cavity to turn about the axis thereof, said member being closed at both ends and having a port in its peripheral wall adapted to be moved into or out of communication with said passage when said member is turned, said housing having an opening leading outwardly from one end of said cavity and a valve seat encompassing said opening, an operating spindle connected to one end face of said member and extending outwardly through said opening, said spindle having an end face of less area than either end face of said member and subject at all times to atmospheric pressure, a valve connected to the spindle and cooperating with said seat to seal said cavity against leakage around said spindle, there being a space between the other end face of said member and the adjacent end wall of said cavity, and a passage provided in said housing leading from the last named space to the clearance space of said cylinder, whereby said member is thrust axially outwards by the pressure prevailing in said cylinder to press said valve against its seat, and a spring encompassing said spindle and tending to draw said valve against its seat.

10. In a multiple stage compressor, a plurality of unloading devices one for each cylinder thereof, each device comprising an oscillatable hollow member having a port therein adapted to be brought into or out of communication with the clearance space of its cylinder when the member is turned, whereby the volume of the space inside said member may be added to the clearance volume of its cylinder when desired, the volume of the spaces inside the several members being different and the ratio of said volumes to the clearance volumes of their respective cylinders being the same, and means for simultaneously moving the several members to simultaneously bring the several ports into or out of communication with their respective cylinders.

11. In a multiple stage compressor, a plurality of unloading devices one for each cylinder of the compressor, each device comprising an oscillatable hollow member having a port therein adapted to be brought into or out of communication with the clearance space of its cylinder when the member is turned, whereby the volume of the space inside each member may be added to the clearance volume of its cylinder when desired, an operating spindle connected to each member, a lever fixed to each spindle, links interconnecting the several levers, and a common operating lever adapted when moved from one position to another to move the several members and simultaneously bring their several ports into or out of communication with their respective cylinders.

12. A clearance chamber for a compressor formed within a hollow member having a peripheral wall with a port therein and end walls cooperating with said peripheral wall to close the chamber except for said port, an operating spindle projecting from the outer face of one of said end walls with its axis disposed coaxially with that of said member, and a valve connected to and encompassing the spindle adjacent the last named end wall.

In testimony whereof I have affixed my signature.

PAUL A. RITTER.